US009205846B2

(12) United States Patent
Cartarius et al.

(10) Patent No.: US 9,205,846 B2
(45) Date of Patent: Dec. 8, 2015

(54) METHOD AND DEVICE FOR THE CONTROL OF FUNCTIONS IN A VEHICLE USING GESTURES PERFORMED IN THREE-DIMENSIONAL SPACE, AND RELATED COMPUTER PROGRAM PRODUCT

(71) Applicant: Daimler AG, Stuttgart (DE)

(72) Inventors: Marco Cartarius, Weil im Schoenbuch (DE); Wiebeke Eide, Mountain View, CA (US); Philipp Fischer, San Francisco, CA (US); Christian Lorenz, Discovery Bay, CA (US); Georg Reil, Vienna (AT); Vera Schmidt, Palo Alto, CA (US); Erich Schoels, Stuttgart (DE); Hartmut Sinkwitz, Heimsheim (DE); Bernhard Straub, Starzach (DE); Simon Zeilinger, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/371,094

(22) PCT Filed: Dec. 12, 2012

(86) PCT No.: PCT/EP2012/005130
§ 371 (c)(1),
(2) Date: Jul. 8, 2014

(87) PCT Pub. No.: WO2013/104392
PCT Pub. Date: Jul. 18, 2013

(65) Prior Publication Data

US 2015/0025740 A1 Jan. 22, 2015

(30) Foreign Application Priority Data

Jan. 10, 2012 (DE) ......................... 10 2012 000 274

(51) Int. Cl.
*G01C 23/00* (2006.01)
*B60W 50/10* (2012.01)

(Continued)

(52) U.S. Cl.
CPC ................ *B60W 50/10* (2013.01); *B60K 37/06* (2013.01); *G06F 3/011* (2013.01); *G06F 3/017* (2013.01);

(Continued)

(58) Field of Classification Search
CPC ...................................................... G06F 3/017
USPC ........................................................... 701/36
See application file for complete search history.

(56) References Cited

U.S. PATENT DOCUMENTS

2008/0065291 A1 3/2008 Breed
2010/0050133 A1 2/2010 Nishihara et al.

(Continued)

FOREIGN PATENT DOCUMENTS

DE 10 2009 046 376 A1 5/2011

OTHER PUBLICATIONS

International Search Report dated Mar. 22, 2013 with English translation (six (6) pages).

(Continued)

*Primary Examiner* — Michael D Lang
(74) *Attorney, Agent, or Firm* — Crowell & Moring LLP

(57) ABSTRACT

A method to control functions in a vehicle using gestures carried out in three-dimensional space. When it is determined that a first gesture carried out in three-dimensional space is detected by an image-based detection procedure, it is determined whether the first gesture is a gesture directed towards a virtual object superimposing a real environment around the vehicle. If it is determined that the first gesture has been detected, it is determined whether a second gesture carried out in three-dimensional space is detected by the image-based detection procedure. If so, it is determined whether the detected second gesture is a gesture allocated to a manipulation of the virtual object, and the virtual object is manipulated accordingly.

10 Claims, 4 Drawing Sheets

400 500 200 300 600 900 700 800

Figure 1:
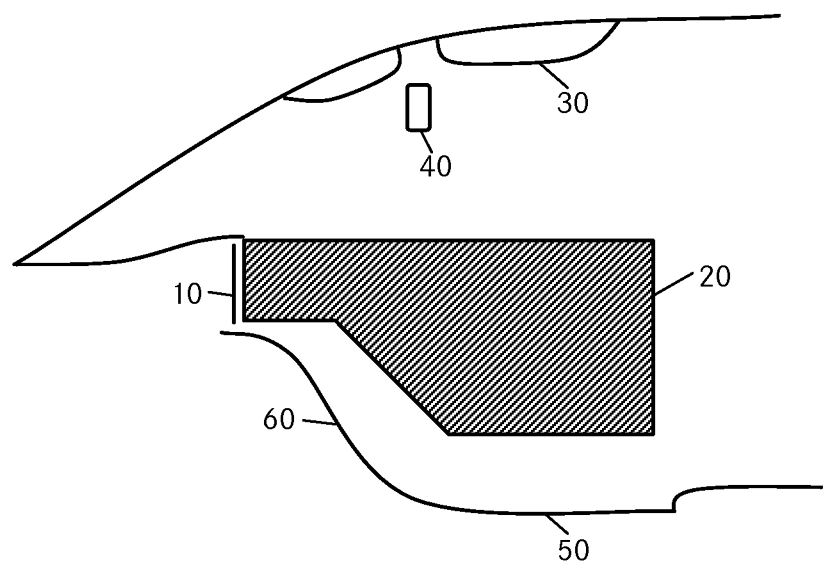

(51) Int. Cl.

*G06F 3/01* (2006.01)
*G06F 3/03* (2006.01)
*B60K 37/06* (2006.01)
*G02B 27/01* (2006.01)

(52) U.S. Cl.

CPC ....... *G06F 3/0304* (2013.01); *B60K 2350/2013* (2013.01); *G02B 27/01* (2013.01); *G02B 2027/014* (2013.01); *G02B 2027/0138* (2013.01)

(56) References Cited

U.S. PATENT DOCUMENTS

2011/0242102 A1* 10/2011 Hess ............................ 345/419
2013/0066526 A1 3/2013 Mondragon et al.

OTHER PUBLICATIONS

German-language Written Opinion (PCT/ISA/237) dated Mar. 22, 2013 (seven (7) pages).

* cited by examiner

METHOD AND DEVICE FOR THE CONTROL OF FUNCTIONS IN A VEHICLE USING GESTURES PERFORMED IN THREE-DIMENSIONAL SPACE, AND RELATED COMPUTER PROGRAM PRODUCT

CROSS-REFERENCE TO RELATED APPLICATIONS

This application is related to PCT Application No. PCT/EP2012/005080, filed Dec. 8, 2012, a National Stage application of which is U.S. application Ser. No. 14/371,090 and PCT Application No. PCT/EP2012/005081, filed Dec. 8, 2012, a National Stage application of which is U.S. application Ser. No. 14/371,022.

BACKGROUND AND SUMMARY OF THE INVENTION

Exemplary embodiments of the present invention relate to a method and device to control functions in a vehicle using gestures carried out in three-dimensional space as well as a relevant computer program product.

U.S. patent publication US 2008/0065291 A1 discloses a method and a device to control functions in a vehicle using gestures carried out in three-dimensional space, in which it is determined whether a gesture carried out in three-dimensional space is detected by means of an image-based detection procedure or not; it is determined whether the detected gesture is a gesture allocated to an operation of a function or not and the function is operated in the case that it is determined that the detected gesture is the gesture allocated to the operation of the function.

Exemplary embodiments of the present invention are directed to a method, a device and a relevant computer program product, which allow a gesture-based control in a vehicle for a user to interact with a real environment around the vehicle in a simple and reliable way.

According to a first aspect, a method to control functions in a vehicle using gestures carried out in three-dimensional space feature a) a determination of whether a first gesture carried out in three-dimensional space is detected by means of an image-based detection procedure or not, b) a determination of whether the first gesture is a gesture that is directed towards a virtual object superimposed on a real environment around the vehicle or not, in the case that it is determined that the first gesture has been detected, c) a determination of whether a second gesture carried out in three-dimensional space is detected by means of the image-based detection procedure or not, d) a determination of whether the detected second gesture is a gesture allocated to a manipulation of the virtual object or not, in the case that it is determined that the second gesture has been detected, and e) a manipulation of the virtual object, in the case that it has been determined that the detected first gesture is the gesture that is directed towards the virtual object superimposed on the real environment around the vehicle and in the case that the detected second gesture is the gesture that is allocated to the manipulation of the virtual object.

According to one embodiment, the manipulation of the virtual object features a displacement of the virtual object onto a display unit of the vehicle.

According to a further embodiment, the manipulation of the virtual object features a copying of the virtual object onto a display unit of the vehicle.

According to a further embodiment, the manipulation of the virtual object features a depiction of information regarding the virtual object on the display unit of the vehicle.

According to a further embodiment, the superimposing of the virtual object onto the real environment around the vehicle is carried out by means of a head-up display and the display unit is at least one instrument panel and at least one central display unit.

According to a further embodiment, the superimposing of the virtual object onto the real environment around the vehicle is carried out by means of a projection of the virtual object into the real environment around the vehicle and the display unit is at least one instrument panel and at least one central display unit.

According to a further embodiment, the virtual object is superimposed onto the real environment around the vehicle at a position corresponding to an object present in the real environment, which is allocated to the virtual object.

According to a further embodiment, the image-based detection procedure is camera-based and a position of an object carrying out a gesture in three-dimensional space is detected.

According to a second aspect, a device to control functions in a vehicle using gestures carried out in three-dimensional space has equipment, which is designed to carry out the method described above or the embodiments thereof.

According to a third aspect, a computer program product to control functions in a vehicle using gestures carried out in three-dimensional space is designed to carry out the method described above or the embodiments thereof directly in combination with a computer or a computer system or indirectly after carrying out a pre-determined routine.

According to the first to third aspects and their embodiments, a user can display information about relevant virtual objects by means of virtual objects superimposed on the real environment around the vehicle by means of a gesture operation on the display unit of the vehicle and in this way can interact with the real environment around the vehicle.

BRIEF DESCRIPTION OF THE DRAWING FIGURES

The present invention is explained in more detail below by means of an exemplary embodiment with reference to the enclosed drawing.

In the drawing is shown:

FIG. 1 a schematic depiction of a basic structure of a display unit and a detection concept according to an exemplary embodiment of the present invention.

Figure 2:
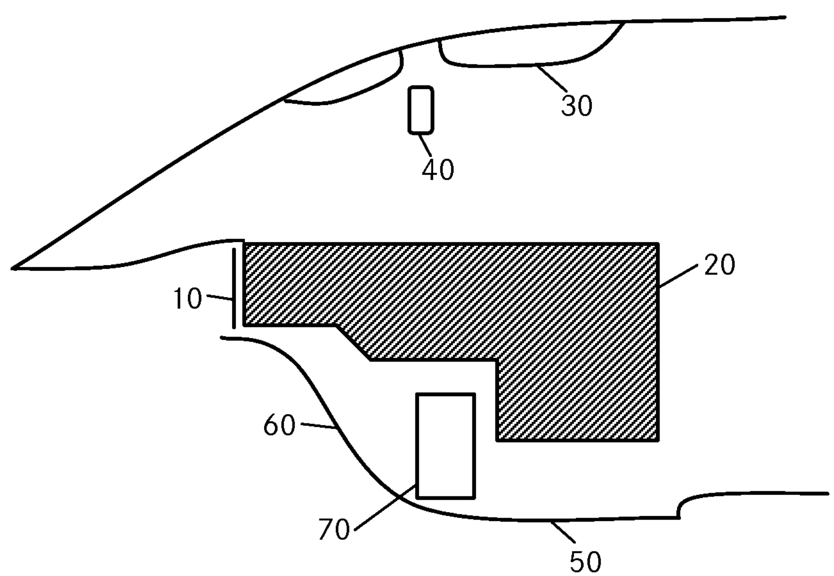

FIG. 2 a further schematic depiction of the basic structure of the display unit and the detection concept according to the exemplary embodiment of the present invention.

Figure 3:
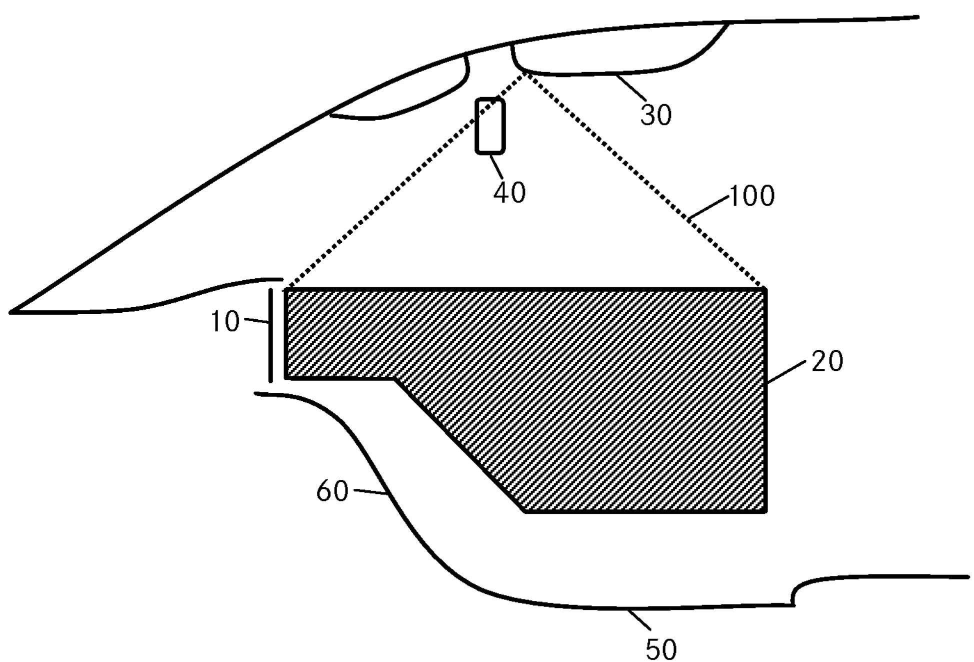

FIG. 3 a schematic depiction of the basic structure of the display unit and an installation location of a detection device in an overhead control unit according to the exemplary embodiment of the present invention.

Figure 4:
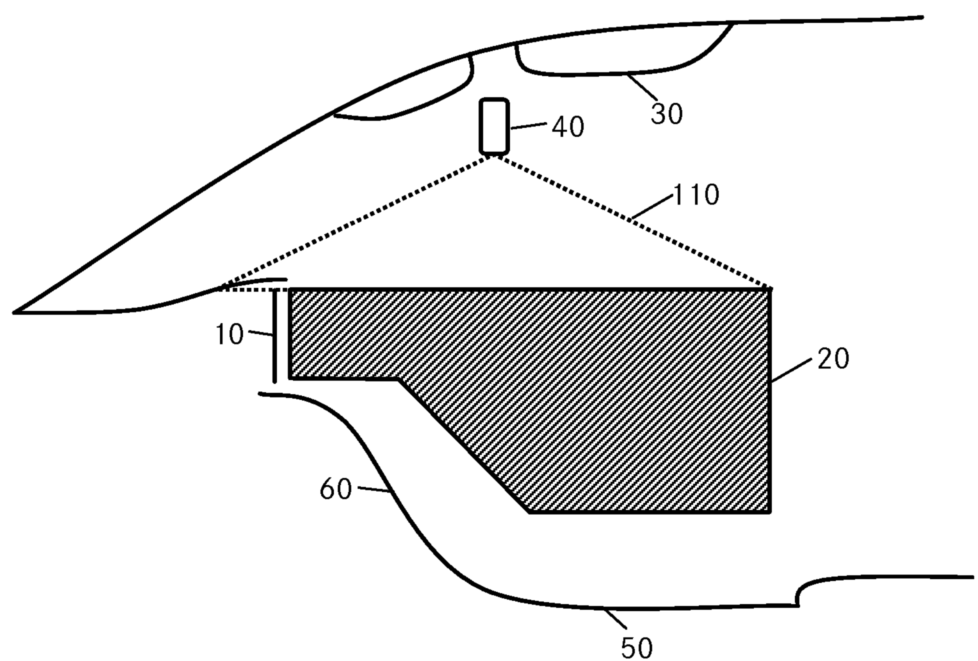

FIG. 4 a schematic depiction of the basic structure of the display unit and an installation location of a detection device in an inner mirror according to the exemplary embodiment of the present invention.

Figure 5:
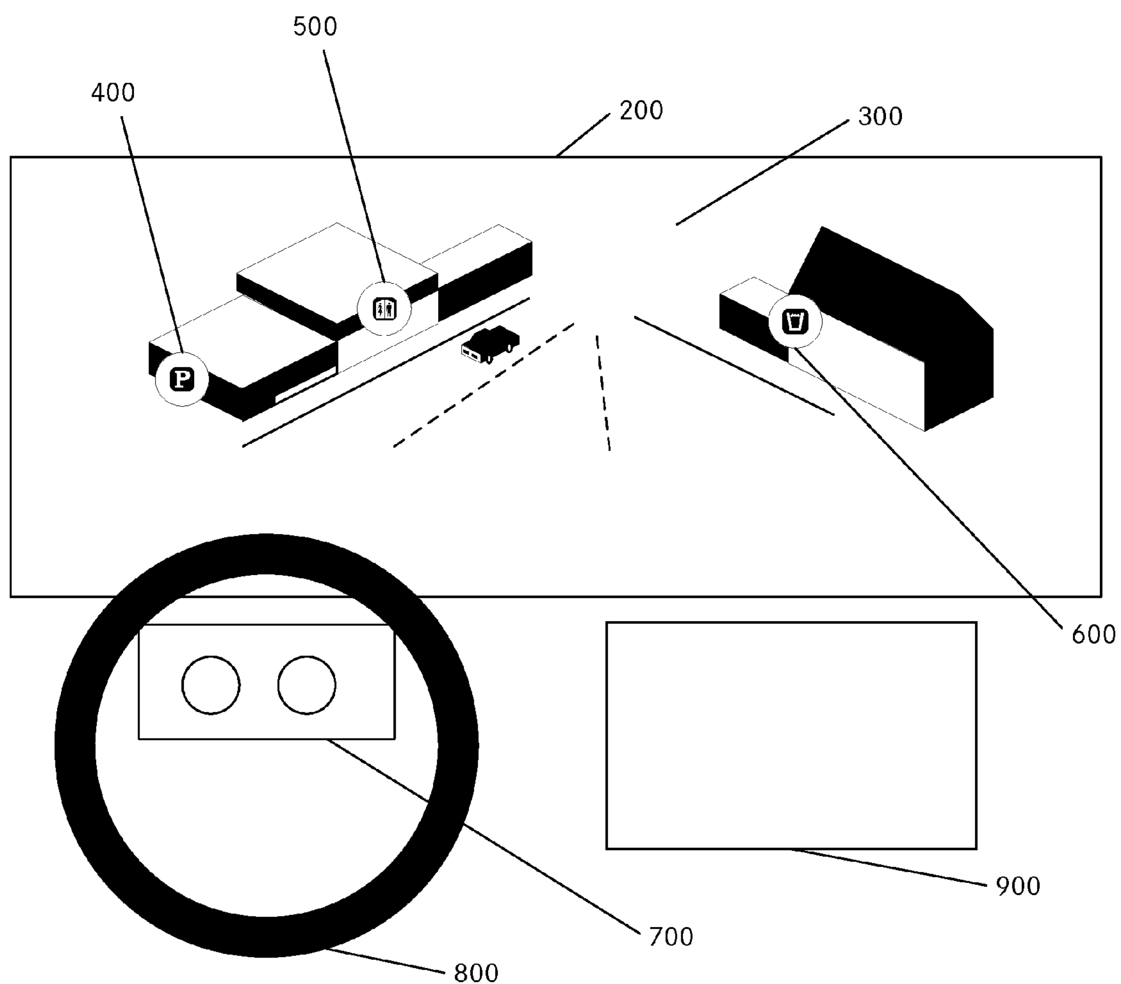
Figure 6:
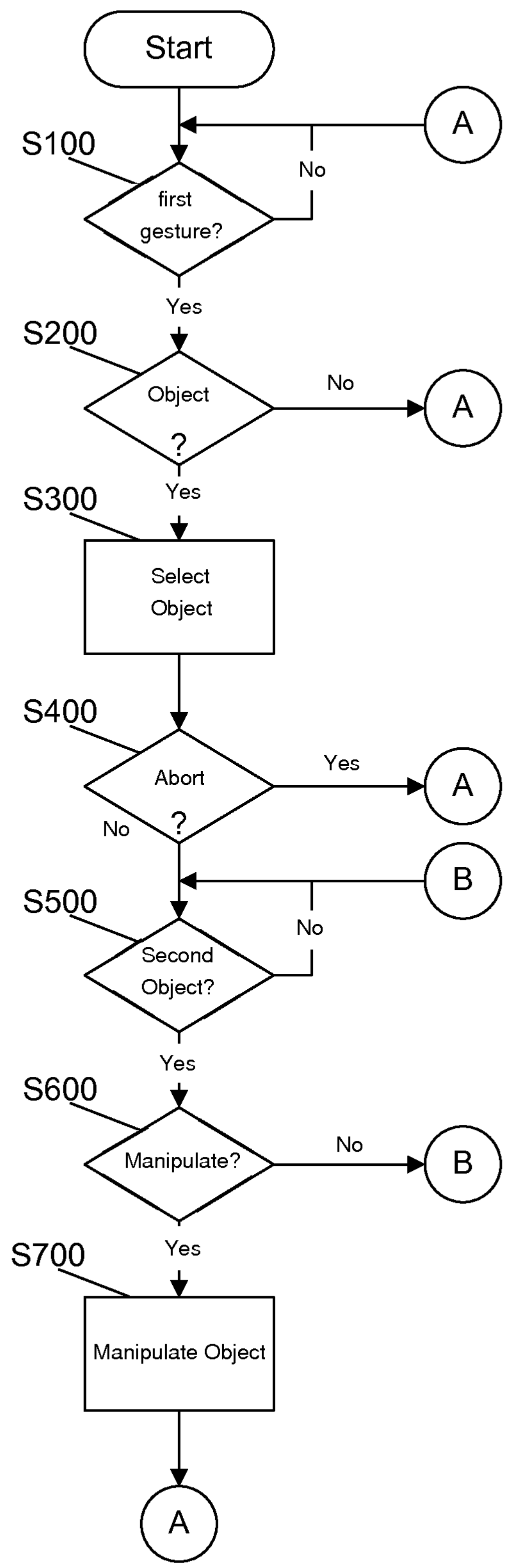

FIG. 5 a schematic depiction of a real environment around the vehicle with virtual superimposed objects according to the exemplary embodiment of the present invention; and FIG. 6 a flow diagram of a method to control functions in a vehicle using gestures carried out in three-dimensional space according to the exemplary embodiment of the present invention.

DETAILED DESCRIPTION

The description of one exemplary embodiment of the present invention occurs below.

It is to be noted that it is hereinafter assumed that a display unit is a preferably central display or an instrument panel of a vehicle, preferably a motor vehicle, and a method to control functions depicted on the display unit using gestures carried out in three-dimensional space in the vehicle is carried out.

Furthermore, a gesture described below is a gesture carried out in three-dimensional space by a user of the vehicle by means of a hand or a finger of the user, without touching a display, such as, for example, a touch screen, or a control element, such as, for example, a touch pad.

The image-based capturing device described below can be any expedient camera, which is able to detect a gesture in three-dimensional space, such as, for example, a depth camera, a camera having structured light, a stereo camera, a camera based on time-of-flight technology or an infra-red camera combined with a mono camera. A plurality of any combinations of such cameras is possible. An infra-red camera combined with a mono-camera improves a detection capability, as a mono camera having a high image resolution additionally provides intensity information, which offers advantages during a background segmentation, and a mono camera is impervious to extraneous light.

FIG. 1 shows a schematic depiction of a basic structure of a display unit and a detection concept according to an exemplary embodiment of the present invention.

In FIG. 1, the reference numeral 10 refers to a display unit of a vehicle, the reference numeral 20 refers to a valid detection region of an image-based detection device, the reference numeral 30 refers to an overhead control unit of the vehicle, the reference numeral 40 refers to an inner mirror of the vehicle, the reference numeral 50 refers to a central console of the vehicle and the reference numeral 60 refers to a dome of the vehicle.

The basic control concept is that a gesture operation to control functions by means of a gesture carried out by a hand or a finger of a user in the valid detection region 20 is carried out in three-dimensional space if the gesture carried out is detected as a predetermined gesture in the detection region 20 by means of the image-based detection device.

The valid detection region 20 is determined by an image-based detection device, which is able to detect a three-dimensional position of the hand or the fingers of the user in the three-dimensional space. Preferably the image-based detection device is a depth camera integrated into the vehicle.

The image-based detection device must be integrated such that a gesture operation is allowed by a relaxed hand and/or arm position of the user at any position in the region above the dome 60 and the central console 50 of the vehicle. Thus a valid detection region can be limited from above by an upper edge of the display unit 10 and from below by a minimum distance to the dome 60 and the central console 50.

A gesture operation is activated if a first gesture is detected in the valid detection region 20, which is a first predetermined gesture. The first predetermined gesture is a static gesture carried out by moving the hand or the finger of the user into the valid detection region 20 and subsequently temporarily leaving the hand or the finger of the user in the valid detection region 20 for a first predetermined amount of time.

The gesture operation is deactivated by moving the hand or the finger of the user out of the valid detection region. A laying of the hand or the arm of the user on the central console 20 and a control of components of the vehicle is carried out under the valid detection region 20, whereby a gesture operation is not activated.

A static gesture is not carried out in the case of a gesticulation in the vehicle and in the case of moving the hand or the finger of the user to a control element, whereby a gesture operation is not activated.

FIG. 2 shows a further schematic depiction of the basic structure of the display unit and the detection concept according to the exemplary embodiment of the present invention.

In FIG. 2, the same reference numerals refer to the same elements as in FIG. 1 and the reference numeral 70 refers to an item present in or on the central console 50 as an obstructive object, such as, for example, a drink container in a cup holder.

The statements made above with regard to FIG. 1 likewise apply for FIG. 2.

A lower boundary of the valid detection region 20 is dynamically adapted to the item 70. Such a context-dependent adaptation of the valid detection region as an interaction region is carried out such that a depth contour of the valid detection region is carried out by means of depth information of the image-based detection device, such as, for example, a depth camera, in real time in the case of a detection of a gesture. This means that a valid gesture must be carried out above the item 70.

An arrangement of the image-based detection device in an overhead region of the vehicle leads to the following advantages: No sunlight shines into a lens of the image-based detection device. A complete detection region is also covered in an adjacent region of the display unit 10 as a valid detection region 20. There is a high image resolution in the main interaction directions to the left, to the right, in front of and behind the gesture operation. The image-based detection device is made up of a normal visual range of driver and passenger. Overhead components can be easily standardized for different series with few design variations. Few requirements for a detection distance are required.

With respect to FIG. 3 and FIG. 4, two possible installation locations for the image-based detection device in the overhead region of the vehicle are illustrated.

FIG. 3 shows a schematic depiction of the basic structure of the display unit and an installation location of the detection device in the overhead control unit according to the exemplary embodiment of the present invention.

In FIG. 3 the same reference numerals refer to the same elements as in FIG. 1 and FIG. 2 and the reference numeral 100 refers to a maximum detection angle of an image-based detection device integrated into the overhead control unit 30 of the vehicle.

The statements made above with regard to FIG. 1 and FIG. 2 likewise apply for FIG. 3.

As can be seen in FIG. 3, the complete valid detection region 20 is covered with the image-based detection device integrated into the overhead control unit 30. A further advantage of the image-based detection device integrated into the overhead control unit 30 is that the greatest possible vertical distance to the valid detection region 20 is achieved.

FIG. 4 shows a schematic depiction of the basic structure of the display unit and an installation location of a detection device in an inner mirror according to the exemplary embodiment of the present invention.

In FIG. 4 the same reference numerals refer to the same elements as in FIG. 1 and FIG. 2 and the reference numeral 110 refers to a maximum detection angle of an image-based detection device integrated into the inner mirror 40 of the vehicle.

The statements made above with regard to FIG. 1 and FIG. 2 likewise apply for FIG. 4.

As can be seen in FIG. 4, the complete valid detection region 20 is covered with the image-based detection device integrated into the overhead control unit 30. In order to compensate for a changing alignment of the image-based detection device due to an adjustment of the inner mirror 40, an alignment offset of the image-based detection device is corrected by means of a contour of the central console 50 in order to carry out a position calibration.

FIG. 5 shows a schematic depiction of a real environment around the vehicle with virtual superimposed objects according to the exemplary embodiment of the present invention.

In FIG. 5 the reference numeral 200 refers to a windscreen of a vehicle, the reference numeral 300 refers to a real environment around the vehicle, the reference numeral 400 refers to a first virtual object, the reference numeral 500 refers to a second virtual object, the reference numeral 600 refers to a third virtual object, the reference numeral 700 refers to a instrument panel, the refers numeral 800 refers to a steering wheel and the reference numeral 900 refers to a central display unit.

Virtual objects, which have a connection to an object present in the real environment 300, which is located at this position, are superimposed onto a real environment around the vehicle, such as, for example, the real environment 300 in front of the vehicle that is visible through the windscreen 200, as is indicated schematically by means of buildings, a road and a proceeding vehicle in FIG. 5. For example, the virtual object can be the first virtual object 400 allocated to a car park, which is superimposed at a position on the real environment 300, at which the car park allocated to the virtual object 400 is present in the real environment, the virtual object can be the second virtual object 500 allocated to a public toilet, which is superimposed at a position on the real environment 300 at which the public toilet allocated to the virtual object 500 is present in the real environment 300, and/or the virtual object can be the third virtual object 400 allocated to a restaurant, which is superimposed at position in the real environment 300 at which the restaurant allocated to the virtual object is present in the real environment 300. Any further and/or other types of objects and virtual objects are likewise possible.

Superimposing of the virtual objects onto the real environment 300 can, for example, be carried out by means of a display of the virtual objects on a so-called head-up display on the windscreen 200 of the vehicle. A further possibility to carry out the superimposing of the virtual objects onto the real environment 300 can be implemented, for example, by means of a projection of the virtual objects onto the real environment 300 by means of a suitable projection device.

The allocation of virtual objects to objects present in the real environment 300 is carried out, for example, on the basis of position coordinates, such as, for example, GPS coordinates, which are obtained by means of a navigation system in the vehicle, and/or an object recognition of the objects present in the real environment 300.

Information that features additional or detailed information with regard to the objects in the real environment 300 relating to the virtual objects is associated with the objects superimposed onto the real environment 300. For example, information regarding the first virtual object 400 can feature a price for the car park present in the real environment 300 or information regarding the third virtual object 600 can feature a menu for the restaurant present in the real environment 300.

The virtual object can be marked or selected by means of a gesture by a user, which is directed towards a virtual object, and the virtual object can be moved or copied to the instrument panel 700 or to the central display unit 900 by means of a further gesture, which is a dynamic gesture or a swiping movement towards the instrument panel 700, which is located behind the steering wheel 800, or the central display unit 900, and information regarding the virtual object can be depicted on the instrument panel 700 or the central display unit 900.

FIG. 6 shows a flow diagram of a method to control functions in a vehicle using gestures carried out in three-dimensional space according to the exemplary embodiment of the present invention.

It is to be noted that a process flow of the flow diagram in FIG. 6 is switched on, for example, after an initialization point, such as, for example, after switching on an ignition of the vehicle, and is carried out in repeating cycles until an end point, such as, for example, a switching-off of the ignition of the vehicle, is reached. Alternatively, the initialization point can, for example, be the point in time of starting a motor of the vehicle and/or the end point can be the point in time of switching off the motor of the vehicle. Other initialization points and end points are likewise possible according to the present application.

A distinction can be made as to whether a gesture is carried out by a driver or by a passenger, which is particularly advantageous in a so-called split view display, which is able to display different pieces of information to the driver and the passenger simultaneously. Likewise, the distinction as to whether a gesture is carried out by a driver or by a passenger out is advantageous with regard to an ergonomic control by the driver or the passenger.

Below, it is assumed that the detected gesture can be both a gesture carried out by the driver and a gesture carried out by the passenger.

Furthermore, it is to be noted that in the case of the distinction described above between a gesture of the driver and of the passenger, the method of the flow diagram in FIG. 6 is carried out both for the driver's side and for the passenger's side. The process sequence shown in FIG. 6 can be carried out expediently, for example, in parallel, in series or in a connected manner for the driver's side and the passenger's side.

In step S100 it is determined whether a first gesture is detected or not. In the case that the first gesture is not detected ("No" in step S100), the process sequence returns to step S100. In the case that the first gesture is detected ("Yes" in step S100), the process sequence advances to step S200.

In step S200 it is determined whether the detected first gesture is a gesture which is directed towards the virtual object superimposed onto the real environment around the vehicle or not. In the case that the first gesture is not a gesture which is directed towards the virtual object superimposed onto the real environment around the vehicle ("No" in step S200), the process sequence returns to step S100. In the case that the first gesture is a gesture which is directed towards the virtual object superimposed onto the real environment around the vehicle ("Yes" in step S200), the process sequence advances to step S300.

The gesture, which is directed towards the virtual object superimposed on the real environment around the vehicle, is, for example, a first predetermined gesture, which is directed statically towards the virtual object for a first predetermined period of time in an interaction region in three-dimensional space. The first predetermined gesture is detected, as has been described above with reference to FIGS. 1 to 5. The interaction region corresponds to the valid detection region described above.

In step S300, the virtual object is marked or selected. After step S300, the process sequence advances to step S400.

In step S400 it is determined whether a predetermined abort condition is fulfilled or not. In the case that the predetermined abort condition is fulfilled ("Yes" in step S400), the process sequence returns to step S100. In the case that the abort condition is not fulfilled ("No" in step S400), the process sequence advances to step S500.

The predetermined abort condition can, for example, be that no gesture has been detected for a fourth predetermined period of time.

In step S500 it is determined whether a second gesture is detected or not. In the case that the second gesture is not detected ("No" in step S500), the process sequence returns to step S500. In the case that the second gesture is detected ("Yes" in step S500), the process sequence advances to step S600.

In step S600 it is determined whether the detected second gesture is a gesture allocated to a manipulation of the virtual object or not. In the case that the second gesture is not a gesture allocated to the manipulation of the virtual object ("No" in step S600), the process sequence returns to step S500. In the case that the second gesture is a gesture allocated to the manipulation of the virtual object ("Yes" in step S600), the process sequence advances to step S700.

The gesture allocated to the manipulation of the virtual object is a second predetermined gesture, which is dynamic in the interaction region in three-dimensional space and is directed from the virtual object that superimposes the real environment, is marked, or is selected, towards a display unit, such as, for example, the instrument panel 700 or the central display unit 900.

In step S700, the virtual object is manipulated, for example it is moved or copied to the display unit or information relating to the marked or selected object is displayed on the display unit. After step S700, the process sequence returns to step S700.

The method described above can be carried out by means of equipment, which forms a device to control functions in a vehicle. A display unit is preferably a central display of the vehicle, preferably of a motor vehicle.

Although specific installation locations for respective cameras are shown in FIGS. 3 and 4, respective cameras can be arranged in other expedient installation locations.

A simple and quick controllability is implemented by the image-based gesture control described above, which improves an control comfort, a control flexibility and control experience for the user, significantly increases the freedom of design for a vehicle interior and allows an interaction of a user with the real environment.

The exemplary embodiment described above is able to be implemented as a computer program product, such as, for example, a storage medium, which is designed to carry out a method according to the exemplary embodiment above, interacting with a computer or several computers, i.e. computer systems, or other processing units. The computer program product can be designed such that the method is carried out only after the implementation of a predetermined routine, such as, for example, a set-up routine.

Although the present invention has been described above by means of an exemplary embodiment, it is to be understood that different embodiments and changes can be carried out without leaving the scope of the present invention, as is defined in the enclosed claims.

The disclosure of the drawing is exclusively referred to regarding further features and advantages of the present invention.

The invention claimed is:

1. A method to control functions in a vehicle using gestures carried out in three-dimensional space, the method comprising:

a) determining whether a first gesture carried out in three-dimensional space is detected by an image-based detection procedure;

b) determining, if is determined that the first gesture has been detected, whether the first gesture is a gesture directed towards a virtual object superimposed onto a real environment around the vehicle;

c) determining whether a second gesture carried out in three-dimensional space is detected by the image-based detection procedure;

d) determining, if it is determined that the second gesture has been detected, whether the detected second gesture is a gesture allocated to a manipulation of the virtual object; and e) manipulating the virtual object if it has been determined that the detected first gesture is the gesture directed towards the virtual object and the detected second gesture is the gesture allocated to the manipulation of the virtual object.

2. The method of claim 1, wherein the manipulation of the virtual object involves moving the virtual object onto a display unit of the vehicle.

3. The method of claim 1, wherein the superimposing of the virtual object onto the real environment around the vehicle is performed by a head-up display and the display unit is at least one instrument panel and at least one central display unit.

4. The method of claim 2, wherein the superimposing of the virtual object onto the real environment around the vehicle is performed by projecting the virtual object into the real environment around the vehicle and the display unit is at least one instrument panel and at least one central display unit.

5. The method of claim 1, wherein the manipulation of the virtual object involves copying of the virtual object onto a display unit of the vehicle.

6. The method of claim 1, wherein the manipulation of the virtual object involves depicting information relating to the virtual object on a display unit of the vehicle.

7. The method of claim 1, wherein the virtual object is superimposed onto the real environment around the vehicle at a position corresponding to an object present in the real environment, which is assigned to the virtual object.

8. The method of claim 1, wherein the image-based detection procedure is camera-based and a position of an object carrying out a gesture is detected in three-dimensional space.

9. A device to control functions in a vehicle using gestures carried out in three-dimensional space, wherein the device is configured to:

a) determine whether a first gesture carried out in three-dimensional space is detected by an image-based detection procedure;

b) determine, if is determined that the first gesture has been detected, whether the first gesture is a gesture directed towards a virtual object superimposed onto a real environment around the vehicle;

c) determine whether a second gesture carried out in three-dimensional space is detected by the image-based detection procedure;

d) determine, if it is determined that the second gesture has been detected, whether the detected second gesture is a gesture allocated to a manipulation of the virtual object; and e) manipulate the virtual object if it has been determined that the detected first gesture is the gesture directed towards the virtual object and the detected second gesture is the gesture allocated to the manipulation of the virtual object.

10. A non-transitory computer-readable medium to control functions displayed on a display unit of a vehicle using gestures carried out in three-dimensional space, wherein the computer-readable medium contains instructions, which when executed by a device, cause the device to:

a) determine whether a first gesture carried out in three-dimensional space is detected by an image-based detection procedure;

b) determine, if is determined that the first gesture has been detected, whether the first gesture is a gesture directed towards a virtual object superimposed onto a real environment around the vehicle;

c) determine whether a second gesture carried out in three-dimensional space is detected by the image-based detection procedure;

d) determine, if it is determined that the second gesture has been detected, whether the detected second gesture is a gesture allocated to a manipulation of the virtual object; and e) manipulate the virtual object if it has been determined that the detected first gesture is the gesture directed towards the virtual object and the detected second gesture is the gesture allocated to the manipulation of the virtual object.

* * * * *